R. LANHAM.
Printer's Roller.
No. 216,964.                 Patented July 1, 1879.
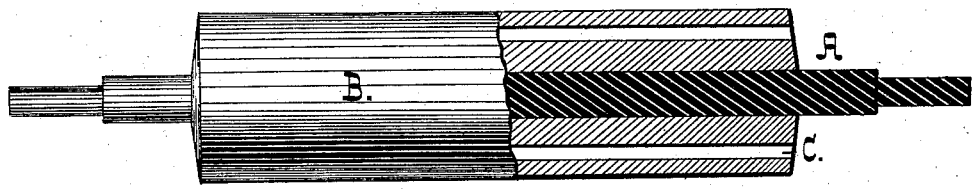
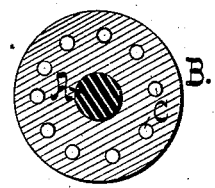

UNITED STATES PATENT OFFICE.

ROBERT LANHAM, OF LONDON, COUNTY OF MIDDLESEX, ENGLAND.

IMPROVEMENT IN PRINTERS' ROLLERS.

Specification forming part of Letters Patent No. 216,964, dated July 1, 1879; application filed April 29, 1879.

*To all whom it may concern:*

Be it known that I, ROBERT LANHAM, of the city of London, in the county of Middlesex, England, have invented a new and useful Improvement in Printers' Rollers, of which the following is a specification.

This invention relates particularly to inking-rollers composed of vulcanized or other india-rubber placed upon an ordinary metal stock; but it may be applied to rollers composed of combinations of india-rubber with other materials.

It consists in increasing the elasticity of the roller, in a perfectly uniform manner, by making it with openings or perforations, like tubes, passing longitudinally from end to end of the india-rubber or other covering of the stock.

In the accompanying drawings, Figure 1 is an elevation, partly in section, of a roller embodying my invention. Fig. 2 is a transverse section of the same.

Similar letters of reference denote similar parts in each of the figures respectively.

A indicates the roller spindle or stock; B, the roller; C, the perforations or channels.

The openings or perforations C contract under the pressure of the roller in working, expanding again as this pressure is relieved, and great and uniform elasticity is thereby given to the periphery of the roller as it rotates.

The process which I employ in manufacturing my elastic roller is as follows: I take a sheet of uncured red rubber, of dimensions suited to the circumference and length of roller required to be made, lay it upon a heated metal surface, and treat it with a little solvent, such, for example, as benzole, turpentine, coal-tar, naphtha, or other. I then place wires or rods, of the size and shape of the holes or perforations required, parallel to each other over the whole face of this sheet of india-rubber, regulating the distances between each according to the degree of elasticity required for the various descriptions of work. I now take another sheet of uncured india-rubber, of the same dimensions as the preceding, treat it with a solvent similarly to the first sheet, and lay it on the top of the wires or rods, place fine linen or canvas over both sheets of rubber, introduce the whole between cloth or blanketing, and subject it to even pressure upon a flat heated surface, the result being that the wires or rods become embedded in the india-rubber, causing a union or junction between the upper and lower sheets. I then remove the cloth or blanketing and the linen or canvas, roll the india-rubber, together with the wires or rods, round the iron spindle or stock, place another sheet of uncured india-rubber over the whole, and wind on until I have made the roller to the required diameter. I now roll several layers of cloth very tightly over the rubber, and subject it to the usual process of vulcanization. The wires or rods are then drawn out, and the roller turned in a lathe and faced.

When large holes are required, I sometimes find it preferable to cover the wires with india-rubber previous to placing them in position.

It will be evident that other processes might be adopted to obtain the perforations in the roller, and I do not confine myself to the use of that above described, although I find it answers very well.

I may make my perforations circular, triangular, polygonal, or of any shape which may be found desirable; and I may arrange them in a single row around the stock, as shown on the drawings, or in several rows, the perforations of each row being of equal or unequal diameter, and of the same or of different shape; and, although I deem it preferable that the perforations should extend through the roller from end to end, it may, in some cases, be found desirable to arrange them otherwise.

What I claim is—

1. As a new article of manufacture, a printer's roller having a series of longitudinal perforations, as and for the purpose set forth.

2. A printer's roller consisting of a stock having a longitudinally-perporated rubber covering, substantially as described.

ROBT. LANHAM.

Witnesses:
 EDWARD WILLIAM JAY,
 WILLIAM EDWARD GEDGE.